(12) United States Patent
Miyamoto et al.

(10) Patent No.: US 7,087,158 B2
(45) Date of Patent: Aug. 8, 2006

(54) OXYGEN-SUPPLY-CAPABLE COOLING WATER EQUIPMENT, FILTRATION-EQUIPMENT AND FILTRATION-EQUIPPED COOLING WATER EQUIPMENT INCORPORATED WITH THESE EQUIPMENT

(75) Inventors: Hisashi Miyamoto, Osakasayama (JP); Akira Nakano, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 10/928,132

(22) Filed: Aug. 30, 2004

(65) Prior Publication Data

US 2005/0029176 A1 Feb. 10, 2005

Related U.S. Application Data

(63) Continuation of application No. PCT/JP03/12187, filed on Sep. 24, 2003.

(30) Foreign Application Priority Data

Sep. 24, 2002 (JP) ............................. 2002-276950

(51) Int. Cl.
*A01K 63/04* (2006.01)
(52) U.S. Cl. ...................... 210/151; 210/169; 210/253; 210/255; 210/266; 261/112.1; 119/261
(58) Field of Classification Search ................ 210/150, 210/151, 169, 253, 255, 266, 286, 295, 323.1, 210/416.2, 615; 261/112.1; 119/259, 260, 119/261

See application file for complete search history.

(56) References Cited

U.S. PATENT DOCUMENTS 1,743,524 A * 1/1930 Cabrera ...................... 210/255

(Continued)

FOREIGN PATENT DOCUMENTS

JP 50-149594 12/1975

(Continued)

OTHER PUBLICATIONS

International Search Report, completed Dec. 4, 2003.

*Primary Examiner*—Christopher Upton
(74) *Attorney, Agent, or Firm*—Griffin & Szipl, P.C.

(57) ABSTRACT

Filtration-function-equipped cooling water equipment that includes: filtration equipment connected to water-purifying, oxygen-supply-capable cooling water equipment, wherein the filtration equipment includes a filtration space for a filter, wherein the water-purifying, oxygen-supply-capable cooling water equipment comprises a cooling oxidation unit disposed inside of a tank body and comprising a honeycombed or latticed porous material, wherein the filtration-function-equipped cooling water equipment operates to enlarge a contact area between water and air when untreated water drips onto the cooling oxidation unit and flows through the cooling oxidation unit while forced air flows in a counter current against the flow of water in the cooling oxidation unit, thereby facilitating solubility of oxygen in the untreated water and augmenting a cooling capability due to evaporation provided by the water-purifying, oxygen-supply-capable cooling water equipment.

5 Claims, 5 Drawing Sheets

U.S. PATENT DOCUMENTS

| | | | | |
|---|---|---|---|---|
| 3,112,261 A | * | 11/1963 | Porter et al. | 210/151 |
| 3,275,147 A | * | 9/1966 | Gilde | 210/150 |
| 3,345,048 A | * | 10/1967 | Phelps | 261/112.1 |
| 3,623,976 A | * | 11/1971 | Cessna | 210/151 |
| 3,950,252 A | * | 4/1976 | Jordan et al. | 210/286 |
| 4,861,465 A | * | 8/1989 | Augustyniak | 210/169 |
| 5,084,164 A | * | 1/1992 | Del Rosario | 210/169 |
| 5,348,654 A | * | 9/1994 | Fischer | 210/151 |
| 5,453,182 A | * | 9/1995 | Kikuta | 210/169 |
| 5,460,722 A | * | 10/1995 | Chen | 210/150 |
| 5,582,719 A | * | 12/1996 | Nagano | 210/151 |
| 5,910,248 A | * | 6/1999 | Tlok | 210/150 |
| 6,012,708 A | | 1/2000 | Nagano | |

FOREIGN PATENT DOCUMENTS

| | | |
|---|---|---|
| JP | 51-124000 | 10/1976 |
| JP | 63-67772 | 5/1988 |
| JP | 08219684 A2 | 8/1996 |
| JP | 10185459 A2 | 7/1998 |
| JP | 11014270 A2 | 1/1999 |
| JP | 11-318271 | 11/1999 |
| JP | 2002-301492 | 10/2002 |

* cited by examiner

US 7,087,158 B2

OXYGEN-SUPPLY-CAPABLE COOLING WATER EQUIPMENT, FILTRATION-EQUIPMENT AND FILTRATION-EQUIPPED COOLING WATER EQUIPMENT INCORPORATED WITH THESE EQUIPMENT

This patent application claims priority under 35 U.S.C. §§ 120 and 365(c) to, and is a continuation-in-part of, International Application No. PCT/JP2003/012187, filed Sep. 24, 2003, and which further claims priority to Japanese Application No. JP2002-276950 filed on Sep. 24, 2002 in Japan. The entire disclosures of the above-captioned applications are incorporated herein by reference.

FIELD OF THE INVENTION

The present invention pertains to the field of water treatment techniques, and more particularly relates to improvements in filtration-function-equipped cooling water equipment.

BACKGROUND OF THE INVENTION

The prior art to which the present invention is directed includes a wide variety of cooling water equipment that has a purification function for the purpose of purifying and cooling water in a water tank, such as is mainly used for breeding fish. One such prior art device previously developed by the present inventor is disclosed by the Japanese Document TOKU-KAI-HEI No. 11-318271.

However, it has been found that prior art cooling water equipment having a purification function, such as disclosed in the afore-mentioned TOKU-KAI-HEI No. 11-318271, have had some practical problems such as: (1) limitations due to a relatively low purification capability, which makes it difficult to make such equipment small in size and energy efficient, (2) difficulties in disbursing the purification load uniformly on a filter's surface in order to use water treatment filters efficiently, and (3) limitations due to loud noise caused by the water purification equipment.

To solve the problems mentioned above, the present inventor has also developed cooling water equipment T (hereinafter called a "filtration-function-equipped cooling water equipment") wherein the filtration function of the equipment is augmented, as illustrated in FIG. 7, by incorporating oxygen-supply-capable cooling water equipment U, such as illustrated in FIG. 6 and disclosed in TOKU-GAN No. 2001-110564, and a filtration equipment F.

Namely, the prior art system is constructed so that oxygen-supply-capable cooling water equipment U illustrated in FIG. 6 is equipped with a water conduction pipe 2, a dispersion body 3, a dripping water guide body 4, a guide plate 4a, dripping water guide pipe 4b, a filler 5, an air supply device 6, a silencing and filtration material 7, and the like, in a treatment tank body 1. The prior art system operates such that water W to be treated drips onto the filler 5 through the dripping water guide pipe 4b, then after biological treatment inside of filler 5 the biologically treated water W1 is filtrated by the silencing and filtration material 7 while a counter-current air flow is made to run into the filler 5 in a counter-current manner through an air passage part P. In this case, the oxygen-supply-capable cooling water equipment U also includes a treated water discharge mouth 8, an air inlet 9, an air exhaust port 10, a cap body 11, and filtrated, biologically treated water $W_3$.

FIG. 7 illustrates filtration-function-equipped cooling water equipment T of the prior art, wherein water purification and filtration functions of the oxygen-supply-capable cooling water equipment U are further augmented. Equipment T is so designed that filtered and biologically treated water $W_3$ is guided from the oxygen-supply-capable cooling water equipment U to the separately installed filtration equipment F. After an additional filtration treatment has been performed by filter 13, the water $W_4$ is then returned to the water tank 12. In this case, the filtration-function-equipped cooling water equipment T also includes a supporter base 14, a pump 15, coupling pipes 16 and 17, and a water level WL.

Oxygen-supply-capable cooling water equipment U, constructed in accordance with the afore-mentioned document TOKU-GAN No. 2001-110564, and a filtration-function-equipped cooling water equipment T incorporating equipment U, have the following advantages: (a) a high water purification performance per volume unit, (b) the ability to make equipment that is smaller in size and energy efficient, and (c) also allowing a low noise of operation. However, certain problems still remain to be solved with respect to the prior art equipment U and T.

First, there is a problem with splashes of water W to be treated. More particularly, with operation of the oxygen-supply-capable cooling water equipment U, as evident from FIGS. 6 and 7, dripping water from pipes 4b mixes in the air flow A and is exhausted through an air exhaust port 10 and is splashed outside of tank body 1 together with the air flow A. For structural reasons, it is difficult to perfectly prevent the dripping water from splashing as described above.

To avoid the occurrence of splashing, a splash prevention cover, and the like, could be mounted on the outside of the air exhaust port 10. However, this added splash prevention cover will cause other problems concerning the appearance of the equipment and the amount of space the equipment will require. Furthermore, with cooling water equipment T wherein the filtration function is augmented as shown in FIG. 7, the method of fitting such equipment to a water circulating system is a matter of concern. In other words, it is feared that the appearance of the equipment, which becomes important when keeping aquarium fish, would be impaired due to the reason that the water tank 12, the filtration equipment F and the oxygen-supply-capable cooling water equipment U are mounted together, one on top of the other thereby forming a 3-step shape.

In addition, with cooling water equipment T wherein the filtration function is augmented as shown in FIG. 7, it is feared that when replacing the filter 13 of the filtration equipment F an activation of microbes is seriously effected, which possibly will require a long time for the aquarium environment to recover from the activation of microbes.

OBJECTS OF THE INVENTION

It is an object of the present invention to solve the problems of the prior art equipment, pertaining to an earlier disclosed filtration-function-equipped cooling water equipment T incorporating oxygen-supply-capable cooling water equipment U and filtration equipment F. An object of the present invention is to overcome the disadvantages and limitations of the prior art equipment, as explained above, such as: (1) overcoming the structural difficulty in completely preventing water from splashing outside of the tank body, (2) overcoming the various difficulties in achieving easy mounting of oxygen-supply-capable cooling water equipment U on a water tank or on filtration equipment, (3) overcoming difficulties in sufficiently maintaining water quality with the filtration equipment F as assessed by biological filtration studies unless more than 2 sets of a filtration equipment F are used jointly, and (4) overcoming the present non-availability of compactly shaped equipment wherein both oxygen-supply-capable cooling water equipment U and filtration equipment F are integrated to facilitate the keeping of aquatic life, such as aquarium fishes and other living things.

In other words, the present invention solves those problems encountered with the conventional oxygen-supply-capable cooling water equipment and the filtration-function-equipped cooling water equipment of the prior art as explained above. It is therefore a principal object of the present invention to provide many consumers with an easy-to-use oxygen-supply-capable cooling water equipment U that (a) is compactly shaped and/or dimensioned, that (b) has a good appearance, that (c) performs excellent purification and filtration operations, and that (d) can be used to construct filtration-function-equipped cooling water equipment T integrally comprising the oxygen-supply-capable cooling water equipment U and filtration equipment F.

SUMMARY OF THE INVENTION

The present invention achieves the stated objectives by providing, in a first embodiment, oxygen-supply-capable cooling water equipment that includes: (a) a tank body provided with an air inlet and an air exhaust port on an upper face side, and a treated water discharge mouth disposed on a lower portion of the tank body; (b) a cooling oxidation unit disposed inside the tank body; (c) a dripping water member installed horizontally at an upper portion of the cooling oxidation unit, wherein the dripping water member drips untreated water so as to disperse the untreated water onto the cooling oxidation unit; (d) a silencing and filtration material disposed at a lower portion of the cooling oxidation unit to filtrate treated water dripping from the cooling oxidation unit; and (e) an air supply device that operates to run air flow into the cooling oxidation unit from the lower portion to the upper portion of the cooling oxidation unit. Such an embodiment is fundamentally composed of a tank body equipped with an air inlet and an air exhaust port on the upper face side and a treated water discharge mouth on the lower part, a cooling oxidation unit installed inside the tank body, a water dripping part installed horizontally on the upper part of the cooling oxidation, to make water to be treated drip onto the cooling oxidation unit while dispersing, a silencing and filtration material installed on the lower part of the cooling oxidation unit to filtrate water to be treated dripping from the cooling oxidation unit, and an air supply device to make an air flow run into the cooling oxidation unit from the lower part to the upper part.

The present invention includes, in a second embodiment, filtration equipment provided with: (a) a filtration tank body having a water discharge mouth on an upper side portion and a water supply mouth on an upper face side; (b) a partitioned draining board disposed inside a lower portion of the filtration tank body; (c) a bulkhead disposed vertically inside the tank body so as to define a water supply space and a filtration space; and (d) a plurality of filtration boxes removably secured, in parallel, inside the filtration space, wherein each filtration box is disposed so that water runs from a bottom face side to an upper face side of each filtration box so that flowing water runs from the water supply space through the lower portion of the filtration tank body and then through the plurality of filtration boxes before being discharged at the water discharge mouth. Such an embodiment is fundamentally composed of a filtration tank body having a water discharge mouth on the upper side part and a water supply mouth on the upper face side, a partitioned draining board installed at the lower part inside the filtration tank body, a bulkhead installed vertically inside the tank body to form a water supply space and a filtration space, and a plurality of filtration boxes removably secured in parallel inside the filtration space and wherein filters are filled to make water run from the bottom face side to the upper face side, thus making flowed-in water run from the afore-mentioned water supply space through the bottom part of the filtration tank body and filtration boxes and being discharged at the afore-mentioned water discharge mouth.

The present invention includes, in a third embodiment, filtration-function-equipped cooling water equipment comprising: (a) oxygen-supply-capable cooling water equipment comprising: (i) a first tank body having an air inlet and an air exhaust port located on an upper face side, and a treated water discharge mouth disposed on a lower portion of the first tank body; (ii) a cooling oxidation unit disposed inside the first tank body; (iii) a water dripping member installed horizontally at an upper portion of the cooling oxidation unit, wherein the dripping water member drips untreated water so as to disperse the untreated water onto the cooling oxidation unit; (iv) a silencing and filtration material disposed at a lower portion of the cooling oxidation unit to filtrate water dripping from the cooling oxidation unit; and (v) an air supply device that operates to run air flow into the cooling oxidation unit from the lower portion to the upper portion of the cooling oxidation unit; and (b) filtration equipment comprising: (i) a filtration tank body having a water discharge mouth on an upper side portion and a water supply mouth on an upper face side; (ii) a partitioned draining board disposed inside a lower portion of the filtration tank body; (iii) a bulkhead disposed vertically inside the tank body so as to define a water supply space and a filtration space; and (iv) a plurality of filtration boxes removably secured, in parallel, inside the filtration space, wherein each filtration box is disposed so that water runs from a bottom face side to an upper face side of each filtration box so that flowing water runs from the water supply space through the lower portion of the filtration tank body and then through the plurality of filtration boxes before being discharged at the water discharge mouth, wherein the oxygen-supply-capable cooling water equipment is connected to the filtration equipment so that the treated water discharge mouth of the oxygen-supply-capable cooling water equipment communicates with the water supply mouth and supplies treated water to the water supply mouth of the filtration equipment. Such an embodiment is fundamentally composed of filtration equipment, in accordance with the second embodiment of the invention, installed with oxygen-supply-capable cooling water equipment in accordance with the first embodiment of the present invention. Both equipment, the oxygen-supply-capable cooling water equipment and the filtration equipment, can be removably secured, or integrally connected, so that water treated by the oxygen-supply-capable cooling water equipment is further filtrated through the filtration equipment.

The present invention provides, in a fourth embodiment, filtration-function-equipped cooling water equipment that includes: filtration equipment connected to water-purifying, oxygen-supply-capable cooling water equipment, wherein the filtration equipment includes a filtration space for a filter, wherein the water-purifying, oxygen-supply-capable cooling water equipment comprises a cooling oxidation unit comprising a honeycombed or latticed porous material, wherein the filtration-function-equipped cooling water equipment operates to enlarge a contact area between water and air when untreated water drips onto the cooling oxidation unit and flows through the cooling oxidation unit while forced air flows in a counter current against the flow of water in the cooling oxidation unit, thereby facilitating solubility of oxygen in the untreated water and augmenting a cooling capability due to evaporation provided by the water-purifying, oxygen-supply-capable cooling water equipment.

Further objects, features and advantages of the present invention will become apparent from the Detailed Description of Illustrative Embodiments, which follows, when considered together with the attached drawings.

LIST OF REFERENCE LETTERS AND NUMERALS

Figure 1:
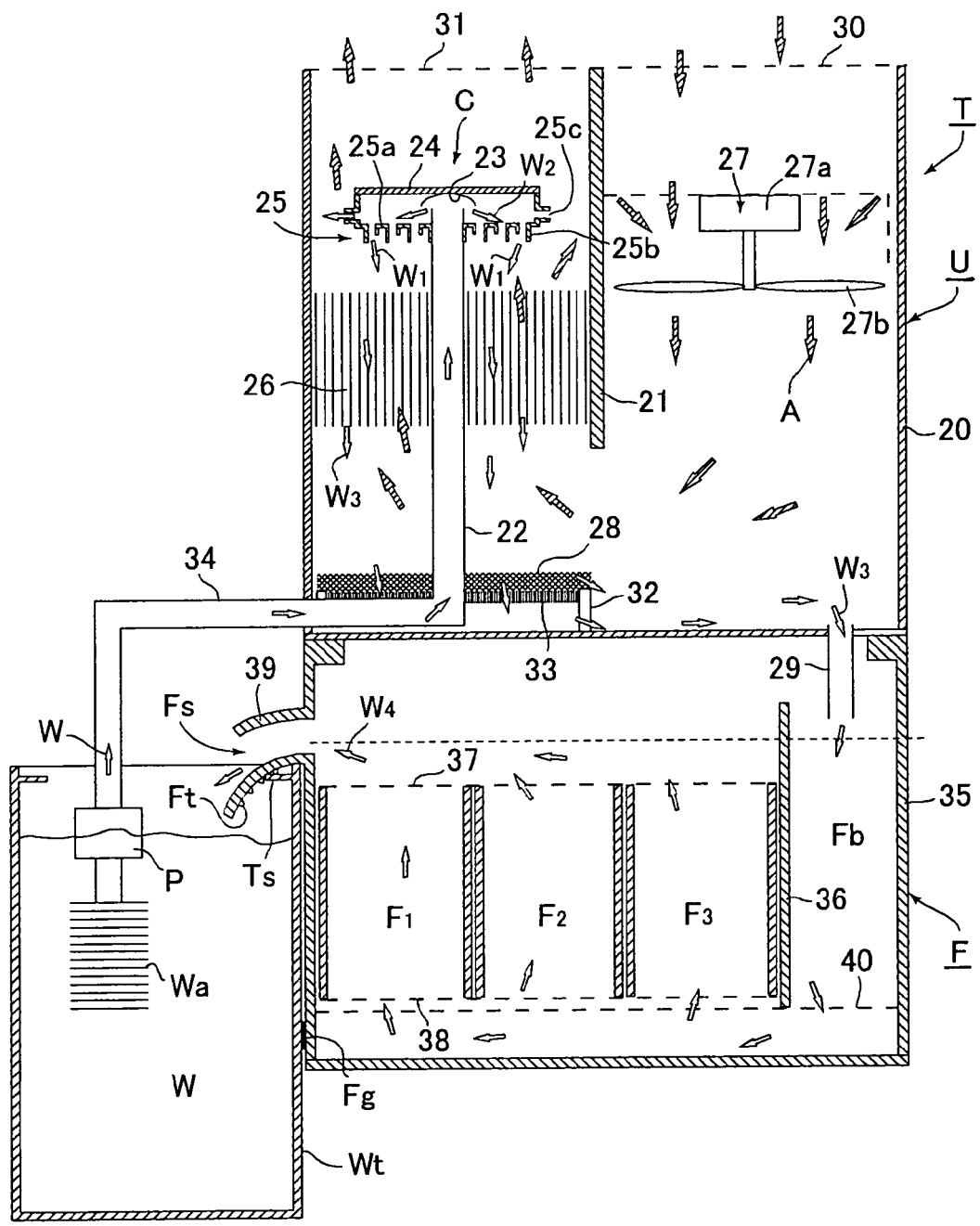
FIG. 1 is a schematic sectional view of filtration-function-equipped cooling water equipment T illustrating one embodiment in accordance with the present invention.

T Filtration-function-equipped cooling water equipment
U Oxygen-supply-capable cooling water equipment
F Filtration equipment
F1, F2, F3 Filtration boxes
Fb Water supply space
WL Water level
Fs Discharge mouth for filtration-treated water W4
Wt Water tank
Ft Projected engagement body
Fg Slip stopper
P Pump
Wa Water suction mouth
Ts Reinforcement material for the upper part of water tank
W Water to be treated
W1 Dripping water
W2 Dispersing water
W3 Treated water
W4 Filtration-treated water
A Air flow
C Water dripping part or member
20 Tank body
21 Bulkhead
22 Water guide pipe
22a Bearing
23 Dispersion body
24 Cover body
25 Dripping water guide body
25a Flat guide plate
25b1 Pore for dripping water
25c Water spray mouth
26 Cooling oxidation unit
27 Air supply device
28 Silencing and filtration material
29 Treated water discharge mouth
30 Air inlet
31 Air exhaust port
32 Supporting body for silencing and filtration material
33 Supporting bridge body
34 Pipe
35 Filtration tank body
36 Bulkhead
37 Upper face of filtration box
38 Bottom face of filtration box
39 Cylindrical discharge mouth
40 Partitioned draining board
41 Revolving water dispersion body
41a Water spray mouth

DETAILED DESCRIPTION OF THE ILLUSTRATIVE EMBODIMENTS OF THE INVENTION

The following illustrative embodiments in accordance with the present invention are described as follows with reference to the attached drawings.

FIG. 1 is a schematic sectional view of cooling water equipment (hereafter called a "filtration-function-equipped cooling water equipment T") wherein the functions/operations of oxygen-supply, purification, cooling and filtration are augmented as described below in order to provide fully processed water. The filtration-function-equipped cooling water equipment T, in accordance with one embodiment of the present invention, comprises oxygen-supply-capable cooling water equipment U on the upper part and filtration equipment F on the lower part of the apparatus.

In accordance with the present invention, water is processed from untreated water W to fully processed water $W_4$ through a series of steps that will be described below. In summary, the untreated water W is drawn up from the water tank Wt and is dispersed as dispersed water $W_2$. The dispersed water $W_2$ is then dripped as dripping water $W_1$. The dripping water $W_1$ is then biologically treated and becomes treated water $W_3$. The treated water $W_3$ is subsequently filtered and becomes filtered, treated water $W_4$, which is fully processed water suitable for many purposes such as keeping aquarium fish. By undergoing the series of steps outlined above, the fully processed water $W_4$ is, in accordance with the present invention, water that is oxygenated, cooled, purified and filtered.

The filtration-function-equipped cooling water equipment T is so constructed that a discharge mouth Fs is formed on the side of filtration equipment F so as to engage with the upper end of the side wall of a water tank Wt. Specifically, one or more projections, or projected engagement bodies, Ft are formed on the lower face side of a cylindrical body 39, which provides the discharge mouth Fs for filtration-treated water W4. This structural construction enables the filtration equipment F to engage with the upper end of the side wall of the water tank Wt, without sliding, by using the projected engagement body Ft. In addition, projection Ft provides the desired engagement with the side wall of the water tank Wt regardless of the shape of any reinforcement materials Ts provided on the upper part of the water tank Wt, such as those known and commercially available on the market.

To additionally prevent the filtration equipment F from sliding against the wall of the water tank Wt, the filtration equipment is constructed with a slip stopper Fg provided between the filtration equipment F and the water tank Ft, thus fully ensuring proper fitting performance. The slip stopper Fg may be made from any suitable material such as soft resin, rubber, and the like, formed in any shape so long as the slip stopper can be employed for achieving slip prevention.

In accordance with the embodiment shown in FIG. 1, oxygen-supply-capable cooling water equipment U and filtration equipment F are connected together. However, the system shown in FIG. 1 can be constructed so that the oxygen-supply-capable cooling equipment U is removably placed on the upper part of the system, and can be removed and used separately from the filtration equipment F by connecting the discharge mouth 29 of equipment U with the water tank Wt. Likewise, the filtration equipment F can be used separately from the system too. When the filtration equipment F, placed on the lower part, is removed and used separately, the intake pipe 34 is connected to provide water to the water supply space Fb of filtration equipment F so that equipment F to may perform its filtration function.

Referring to FIG. 1, the following elements are designated: water W to be treated, dispersing water $W_2$, dripping water $W_1$, treated water $W_3$, Filtration-treated water $W_4$, air flow A, water dripping part or member C, tank body 20, bulkhead 21, water guide pipe 22, dispersion body 23, cover body 24, dripping water guide body 25, cooling oxidation unit 26, air supply device 27, silencing and filtration material 28, treated water discharge mouth 29, air inlet 30, air exhaust port 31, supporting body for silencing and filtration material 32, supporting bridge body 33, and pipe 34. The major operative parts of the oxygen-supply-capable cooling water equipment U include the water dripping member C; a cooling oxidation unit 26; an air supply device 27; and silencing and filtration material 28. The water dripping member C includes a dispersion body 23, a cover body 24, and a dripping water guide body 25.

Referring again to FIG. 1, the following additional elements are designated: a filtration tank body 35, a bulkhead 36, Filtration boxes (cassette type) F1, F2, F3, the upper face 37 of the filtration boxes, the bottom face 38 of the filtration boxes, a discharge mouth Fs, a cylindrical body 39 forming the discharge mouth, a partitioned draining board 40, water supply space Fb, a pump P, and a water suction mouth Wa. In this embodiment, filtration equipment F includes the filtration tank body 35, bulkhead 36, filtration boxes F1, F2, F3, a cylindrical discharge mouth provided by cylindrical body 39, and a partitioned draining board 40. While several filtration boxes F1, F2 and F3 are illustrated, the filtration equipment can be constructed to have only one large filtration box, or multiple separate replaceable filtration cassettes, or one large multi-compartment filtration box in which filtration cassettes can be placed, without departing from the scope of the present invention.

The tank body 20 is made of synthetic resin formed in a square shape, and the inner portion of the tank body is divided into 2 sections by a bulkhead 21: a water purification portion and air passage portion. In addition, the treated water discharge mouth 29, the air inlet 30, and the air exhaust port 31 are installed on the tank body 20. Furthermore, the lower portion of the bulkhead 21 defines an air passage opening. The water guide pipe 22 is contiguous with the intake pipe 34 and inserts into the inside or inner portion of the tank body 20 through a lower side portion of the tank body. The water guide pipe 22 is also inserted through the near-center portion of the water purification portion of the embodied system so as to sit upwards with the upper end of the water guide pipe 22 kept open and oriented towards the lower face side of the dispersion body 23.

The dispersion body 23 is supported by and fixed to the reverse face side of the center portion of the cover body 24. The dispersion body 23 is formed in a round and reverse-dish (or bowl)-shape having a larger diameter than that of the water guide pipe 22. In other words, the dispersion body 23 is a curved structure having its concave face oriented towards the open end of the water guide pipe 22.

The dripping water guide body 25 is supported by and fixed to the water guide pipe 22 so as to be disposed at the lower portion of the dispersion body 23, in a near-horizontal position, with an appropriate space present between the dripping water guide body and the upper end surface of the cooling oxidation unit 26. This appropriate space, as described later, is formed by fixing the upper end portions of a number of short dripping water guide pipes 25b, each pipe 25b having openings at both upper and lower ends, with the flat shaped guide plate 25a.

The cooling oxidation unit 26 is provided by either the so-called filtration unit, or by an oxidation treatment unit. It should be noted that any structural material can be used to make the filtration unit/oxidation treatment unit so long as this material has a honeycomb-shape in the cross-section and is made of porous synthetic resin, ceramics or the like, and is corrosion-resisting. Because it is desirable that the cooling oxidation unit 26 function as a microbe retention body as well, the fine pores of the honeycombed wall of the cooling oxidation unit 26 must be sized from 1 to 1000 micro meters, or more preferably the size from 100 to 500 micro meters, in order to retain microbes. In addition, having fine pores in these size ranges makes the contact area between circulating dripping water W1 and the airflow A larger, and also enhances the oxygen-supply capability and the cooling properties of water evaporation for the cooling oxidation unit 26. Optimally, the wall made of the honey-combed structural material is provided with through perforations.

Other materials desirable for use in making the cooling oxidation unit 26 include organic high polymer materials, such as polypropylene, polyethylene and the like, materials made from silicic acid compounds, such as diatomaceous earth and the like, which are sintered and will activate the absorption capabilities of organics via use of porous crystals such as moisture magnesia silicate and the like, materials made from natural ores such as active carbon, zeolite and the like, or materials that include ion exchange agents.

In order to improve the dissolution of oxygen into the treated water and to improve the cooling properties of water evaporation, it is desired that the contact surface between the treated water with air occupies a large area, preferably the larger the better. However, it is difficult to specify the optimal size of the fine pores of the honeycombed structural material, the coarse irregularities of the contact surface therein, the retention time of the water in the structural material, and the like because optimizing these factors depends on the viscosity of the supplied water. However, it is generally desired that the fine pores of the structural material are of approximately 100 to 2000 micro meter in size. On the other hand, it is otherwise too difficult to generalize optimal conditions for the coarse irregularities of the contact surface.

Therefore, it is most desirable that the wall of the cooling oxidation unit 26 is formed with continuous irregular-shaped fine pores and with a wall thickness of approximately 1 mm–3 mm. However, the caliber of the honeycomb pores and the thickness of the outer wall should be chosen depending on the size, the flow rate and the wind volume of the equipment T.

As illustrated in FIG. 1, the cooling oxidation unit 26 is a honeycombed structure. However, cooling oxidation unit 26 can be of porous fibrous materials, or porous materials having irregularly shaped cross sections, so long as the air supply/discharge (i.e., oxidation process) is sufficiently performed to achieve the same oxidation aims.

The air supply device 27 includes a motor 27a and a moving vane 27b. Air flow A is created by sucking air through air inlet 30 and then forcing the air to pass through an air passage defined by the bulkhead 21, then through a vent hole also defined by the bulkhead 21, then through the water purification portion and the cooling oxidation unit 26 before the air flow A is exhausted outside of the tank body 20 through the air exhaust port 31.

Silencing and filtration material 28 is employed, as shown in FIG. 1, for the purpose of silencing noises caused when treated water $W_3$ drips and also for the purposes of re-oxidizing, and filtrating floating suspended matter and the like, not fully filtrated at the stage water passes through the cooling oxidation unit. Silencing and filtration material 28 is preferably selected from suitable soft organic materials such as porous urethane sponges, polypropylene, and the like, which are good at silencing noises and filtrating suspended matter. As long as a material is suitably functional for both silencing noises and filtrating suspended matter, any material of any shape can be used as the silencing and filtration material 28.

Having described the operational elements of an apparatus embodiment in accordance with the present invention, the operation of the oxygen-supply-capable cooling water equipment U, in accordance with the present invention, will be explained.

Water W to be treated is supplied through a water supply mouth Wa, and is dispersed at the dispersion body 23 through a water guide pipe 22. Dispersed water $W_2$ runs through pores 25b1 for dripping water contiguous with dripping water guide pipes 25b. Some excess dispersed water $W_2$ becomes collected water that is sprayed at a water spray mouth 25c in order to maintain water dripping uniformly onto the cooling oxidation unit 26. Evaporation of dripping water $W_1$ is enhanced by counter-current air A supplied by an air supply device 27. Air A moving in the cooling oxidation unit 26 thus takes away heat by evaporation, which results in lowering the temperature of water (i.e., the treated water $W_3$) and lowering the temperature of exhaust air (i.e., the air flow A), and also results in dissolving more oxygen into the treated water $W_3$. The present invention prevents the occurrence of dripping water $W_1$ splashing toward the outside of the tank body 20 because the air flow A is discharged upwardly from the tank body 20 and the water dripping member C obstructs the splash as well. Thus, the splash from dripping water that occurred with the conventional apparatuses of the prior art is not observed with equipment constructed in accordance with the present invention.

It is generally desirable that water W to be treated and that is supplied through the water supply mouth Wa be pre-treated to remove foreign matter or particles having larger diameters. For this purpose, a Rasshig ring or a fiber-type physical filter can be connected to the intake pipe 34 or the water supply mouth Wa. For the purpose of removing pigments, smells and the like, physical absorbents such as active carbon and the like can be disposed along the intake pipe or the water supply mouth as well.

Treated water $W_3$, which has been cooled and in which oxygen has been forcibly-dissolved, is oxygenated and cooled water that drips onto the silencing and filtration material 28 located at the lower portion of the cooling oxidation unit 26. Then, this treated water $W_3$ is discharged through the discharge mouth 29 and enters into the filtration equipment F.

The filtration equipment F includes a square-shaped filtration tank body 35, and a plural number of filtration boxes F1, F2, F3, and the like, inserted and fitted within the filtration space defined by bulkhead 36. Each of the filtration boxes F1, F2, F3 is supported by and fitted to the partitioned draining board 40. The draining board 40 is constructed so that water can pass freely through the draining board. Likewise, the bottom face 38 and the upper face 37 of the filtration boxes F1, F2, F3 are made to have a structure similar to that of the draining board so that water can pass through the filtration boxes. The upper face 37, which is constructed similarly to the draining board, is removably secured to the filtration boxes so that the upper face 37 can be removed and a filter can be refilled in each one of the filtration boxes F1, F2, F3. It is not necessary to specify what material or shape must be chosen to make a filtration box. Those skilled in the art would realize that any suitable material or geometry can be chosen so long as the purpose of making a durable filtration box that permits the free flow of water is achieved.

The filtration boxes F1, F2, F3 are made independently, therefore, there can be a separate bottom face 38 and corresponding upper face 37 made of the draining board structure so that any one of the filters can be separately refilled as needed. Furthermore, because filtration boxes F1, F2, F3 are independently constructed, any given box can be taken out for cleaning, or replacement, without moving the other ones. This modular advantage is important when filtration studies are performed. The present invention can also be constructed using a main filtration box located within the filtration space, wherein the main filtration box is divided into three compartments and each compartment is dimensioned to receive one of the three independent filtration boxes.

Specifically, with conventional filtration equipment, the filtration box and filter are so structured that they are separable. However, in order to clean or replace any one filter or portion thereof, it becomes necessary to take out or move others filters or portions in order to clean, replace, repair or maintain a filter. When such work is done, the previously active biological filtration halts or diminishes and the biological activation of microbes due to air contact, or relocation, causes changes in the aerobic/anaerobic growth, and water flow, and the like. Changes in water quality are consequently caused, which may seriously influence and impede the breeding of living creatures.

To deal with the problem of incidental biological activation of microbes during work on filtration equipment, the embodiment illustrated in FIG. 1, in accordance with the present invention, employs filtration boxes F1, F2, F3 so structured that it is possible to maintain sufficient biological filtration by cleaning or replacing only one of the filters while leaving the other filtration layers untouched. In this manner, regular cleaning or replacement of one of the filtration layers (i.e., filters) can be performed while the others remain undisturbed, and the cleaning of the multiple filters can be staggered longer than one month so all of the filters can eventually be cleaned or replaced regularly without completely interrupting filtration.

The advantage of the equipment F or T, in accordance with the present invention, over conventional filtration equipment would be readily appreciated by those skilled in the art. Specifically, when a water tank is set up to breed aquatic creatures, the tank water is slightly contaminated in the beginning, and microbes are gradually activated and grow within the filters in the filtration boxes, which enhances certain biological filtration activities. Unfortunately, the activation rate rises along with the development of bacterial contamination. When a filter is in the state of activation, it looks very dirty to the human eye. When the activated filter is left alone, the filtration function eventually deteriorates and the activation rate is also lowered considerably in due course as a result of microbial overgrowth.

Suppose that one of the filtration boxes F1 (or the filter therein), for example, is replaced at this stage. Biological filtration activity of the newly replaced filtration box F1 is 0%. Meanwhile, let's assume that the other 2 filtration boxes carry an activation rate of 70%. According to available data collected for this disclosure, the activation rate for the three filtration boxes F1, F2, F3 will be lowered to 30% on average at this time. Likewise, when any one of the other filters contact air, or are relocated, or are changed, there will be a decrease in the overall activation rate of the system. However, manipulation of one of the filters may have effects that go further than just lowering the activation rate. For example, in the case of an aerobic aquarium environment, hazardous substances such as ammonium or nitrous acid start accumulating. This is what is called an "inactivation phenomenon of the anaerobic denitrification action" and this is undesirable.

Returning to the experimental system data discussed above, after the filtration box F1 (or the filter therein) has been replaced and left for 2 weeks, the activation rate of the filtration box F1 rose to around 50%, while the other 2 filtration boxes F2, F3 still maintained an activation rate of 70%. In other words, while the activation rate of filtration box F1 increased, the activation rates of filtration boxes F2, F3 remained at a plateau. One month later, it was observed that filtration box F1 had an activation rate of 70%. Subsequently, the filtration box F2 was replaced, and the activation rate for each filtration box was measured. The results of measuring activation rates at this time showed that the activation rates of the filtration boxes were F1=85%, F2=0% and F3=65%, respectively. Accordingly, water quality has been ensured because a mean activation rate of 50% for the three filtration boxes has been achieved. Those skilled in the art would realize that if all three filtration boxes F1, F2 and F3 are changed simultaneously, then the overall activation rate drops to 0% and the above data indicates that it will take about 2 weeks for the three filtration boxes to achieve a 50% activation rate. However, such a prolonged drop in the activation rate of the filters can have a deleterious effect on aquarium fish.

Thus, when the filter replacement of the filtration boxes F1, F2, F3 is rotated in a repetitive and staggered manner as described above, it is possible to achieve a steady state average activation rate of greater than 50% per box. Assuming the case wherein the total volume of all filtration boxes is 1.5 L, and that the aquarium is properly maintained with appropriate feedings performed and regular water changes conducted for a 150 L water tank (e.g., approximately 30 L of water per week is changed using tap water normally available in urban cities in Japan), approximately 500 small-sized adult aquarium fish (for example, paracheirodon axeirodi) can be raised and maintained in the water tank environment until their natural death.

It is preferred that the more filtration boxes that are used the better because the more filtration boxes used the more frequent economic replacement of filtration boxes can be performed while maintaining a higher steady state activation rate. However, there will be some practical limitation on the number of filtration boxes that can be used because there is limited space for locating them. In addition, the aforementioned data results discussed above will vary depending on the type of living creatures to be fed within the water tank environment and the type of filters used in the filtration boxes.

Referring to FIG. 1, cooled, oxygenated, treated water W3, having appropriate temperature and ideal oxygen saturation parameters in view of biological filtration studies, is supplied from the oxygen-supply-capable cooling water equipment U on the upper portion of equipment T to the filtration equipment F arranged underneath through discharge mouth 29. This treated water W3, as supplied by discharge mouth 29, runs through a partitioned draining board passing through the water supply space Fb in the filtration tank body 35, and travels through the filtration boxes F1, F2, F3 in the direction of the arrows shown in FIG. 1. Once the treated water passes through the filtration boxes, it has been filtered and becomes filtration-treated water W4, which is returned to the water tank Wt through discharge mouth Fs.

Figure 2:
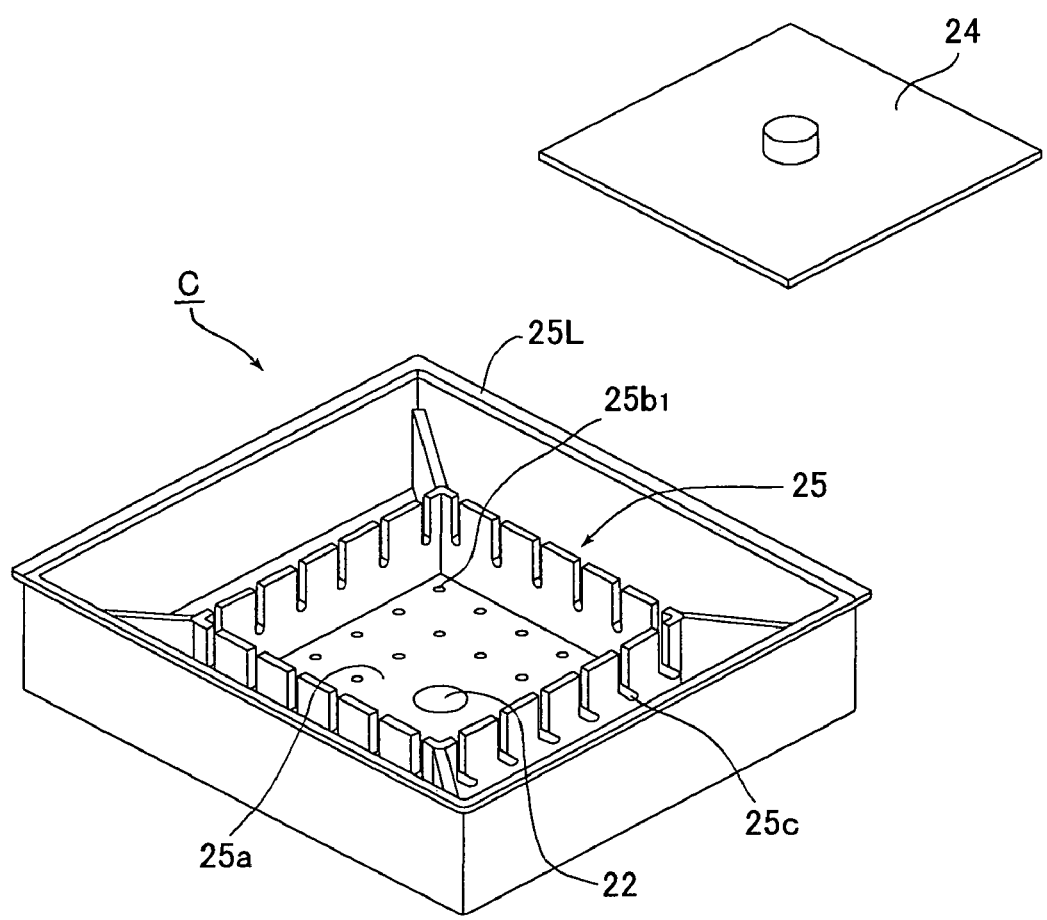
FIG. 2 is a perspective view of a water dripping part C that would be employed with oxygen-supply-capable cooling water equipment U in accordance with the present invention.

FIG. 2 is a perspective view of the dripping water guide body 25 and a cover body 24, which form the water dripping member C, in accordance with one embodiment of the present invention. The dripping water guide body 25 is formed in the shape of a square box wherein the upper face is kept open, and a number of dripping water guide pipes 25b are mounted on the reverse surface side of a flat plate 25a, in which pores 25b1 for dripping water are made. A number of water spray mouths 25c are formed around the wall of dripping water guide body 25. Furthermore, the cover body 24 is removably secured on the upper portion of the square-shaped wall of the dripping water guide body 25, and a dispersion body 23 is fitted on the reverse face side of cover body 24 as shown in FIG. 1.

The embodiment of the water dripping member C shown in FIG. 2 includes an additional frame 25L connected with the embodiment of the water dripping member C shown in FIG. 1. In other words, the embodiment of the water dripping member C shown in FIG. 2 includes a frame 25L that is not present in the embodiment shown in FIG. 1. The frame 25L serves to collect and retain water sprayed through the spray mouths 25c. The structures of the various embodiments for the water dripping member C allows air flow A through the cooling oxidation unit 26 to be released upwardly in a smooth fashion.

Figure 3:
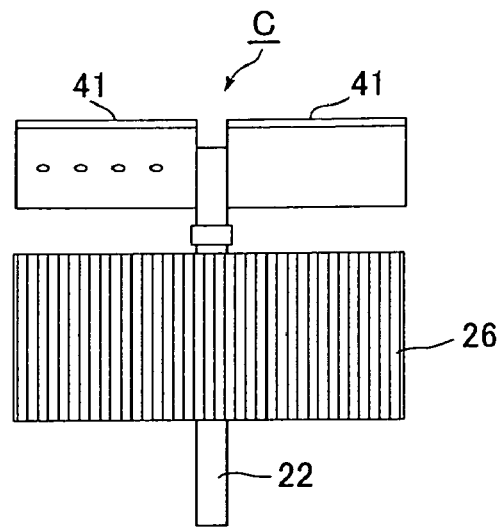
FIG. 3 is a front view illustrating another embodiment of the water dripping part C.
Figure 4:
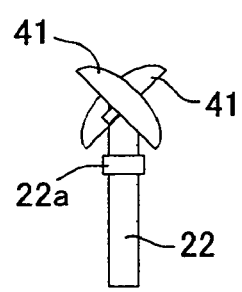
FIG. 4 is a partial side view of the water dripping part C shown in FIG. 3.
Figure 5:
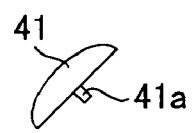
FIG. 5 is a side view of a revolving water spray body.
Figure 6:
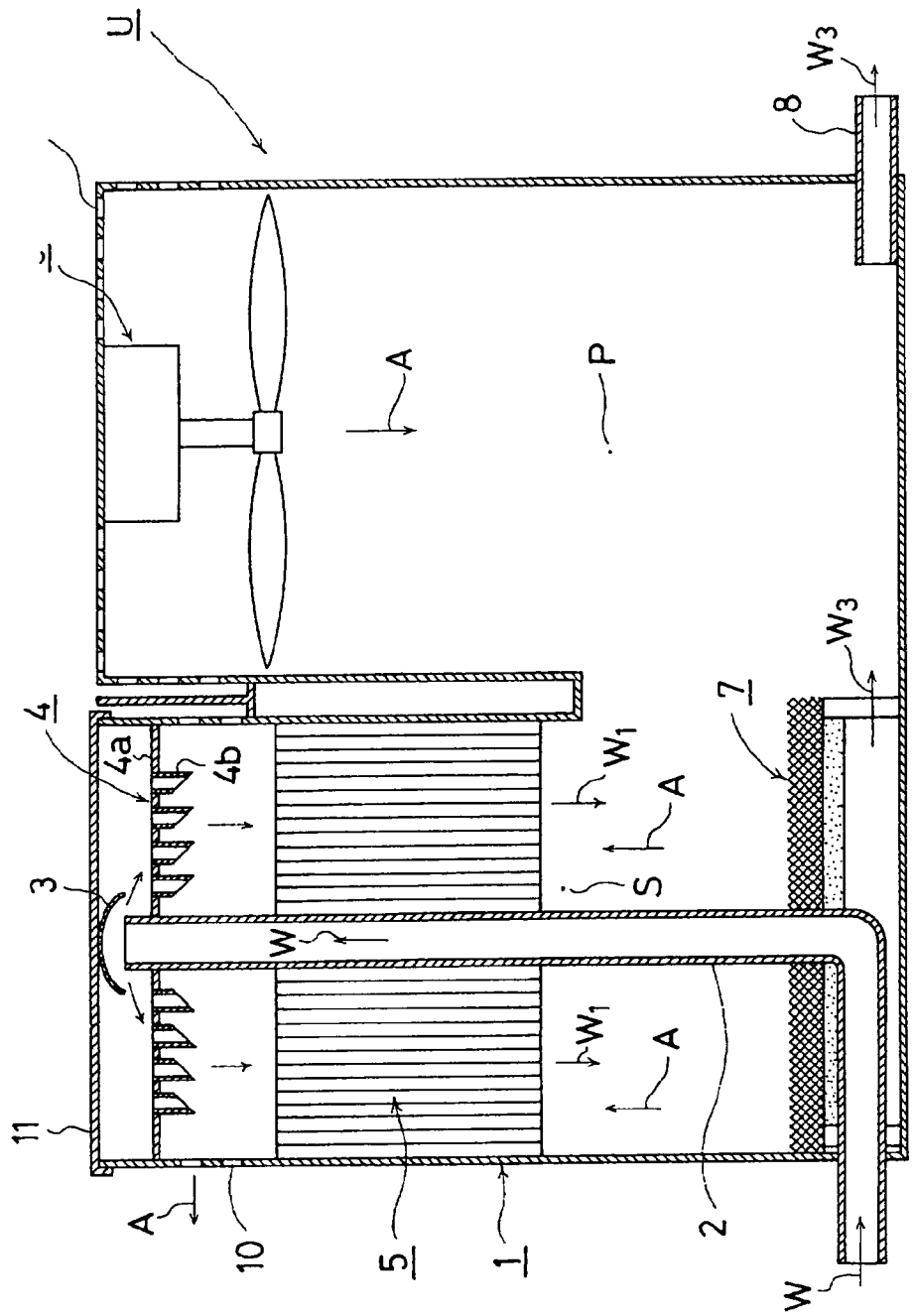
FIG. 6 is a schematic sectional view of an oxygen-supply-capable cooling water equipment of the prior art.
Figure 7:
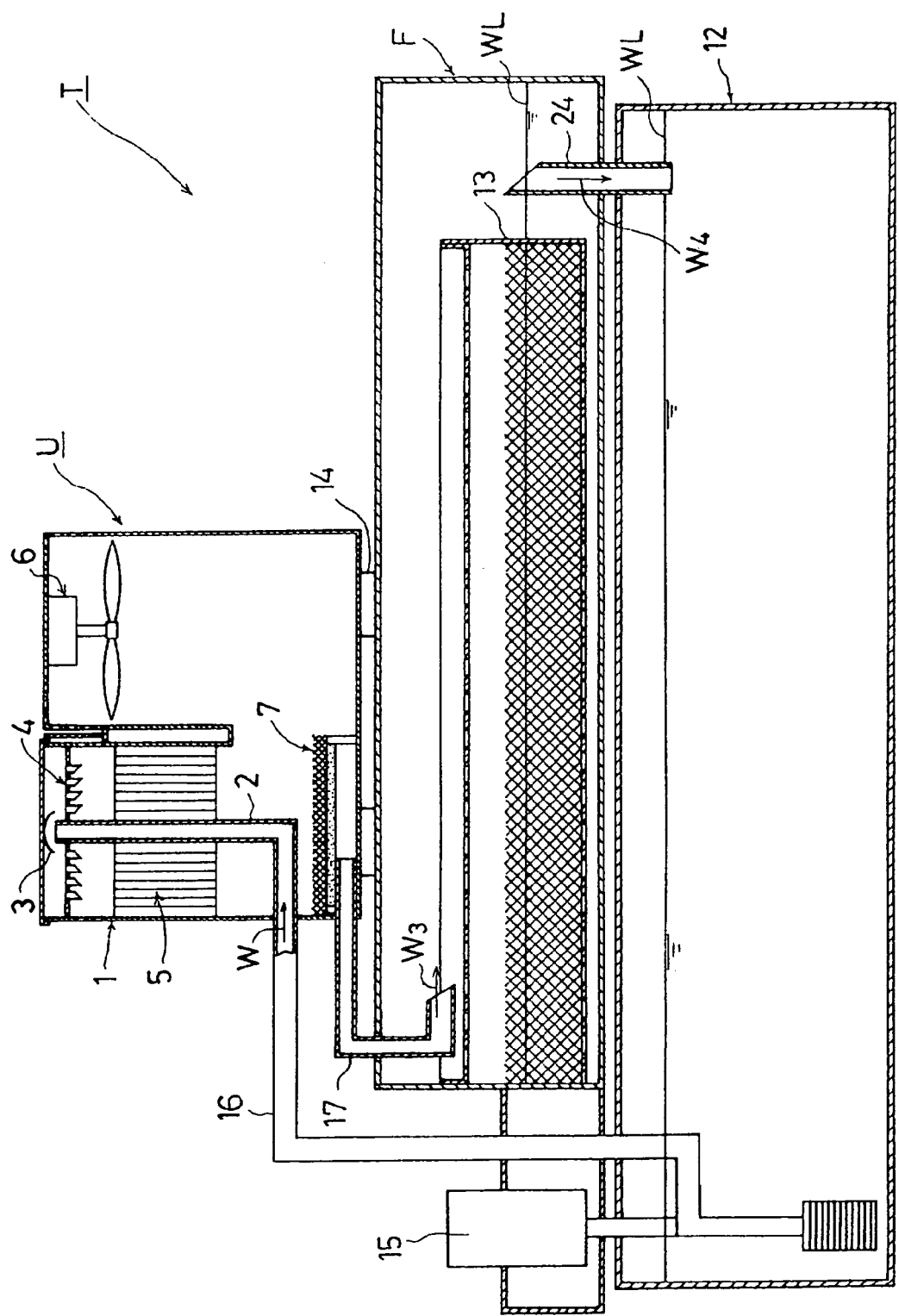
FIG. 7 is a schematic sectional view of a filtration-function-equipped cooling water equipment of the prior art.

FIG. 3 is a front view to illustrate yet another embodiment of the water dripping member C in accordance with the present invention, and FIG. 4 is a side view of the water dripping member C shown in FIG. 3. FIG. 5 is a side view of a revolving water dispersion body 41 used in constructing the water dripping member C shown in FIGS. 3 and 4. This particular embodiment of the water dripping member C includes two separate revolving water dispersion bodies 41 and a bearing 22a, which are installed at the upper end portion of the water guide pipe 22. In this embodiment, water W to be treated is guided into the revolving water dispersion body 41 as a jet-spray sprayed through a water spray mouth 41a, which causes the revolving water dispersion body 41 to rotate in reaction to impact with the jet-spray.

In accordance with this embodiment, equipment T or U is constructed so that water W to be treated is supplied through the water guide pipe 22 and reaches the revolving water dispersion body 41 by being sprayed through the water spray mouth 41a. The water spray mouth 41a is set and oriented in a downward facing position at an angle of approximately 45° from the vertical defined by the upward orientation of the water guide pipe 22 as shown in FIG. 4. This construction causes the dispersion bodies 41 to react to impact with the jet-spray to yield propulsion thereby revolving the water dispersion bodies 41 so that each water dispersion body 41 rotates around the bearing 22a, which serves as the axis of rotation. To facilitate rotation, each revolving water dispersion body 41 is shaped in the form of a propeller to make the rotation go smoothly in the presence of the wind pressure yielded by the air supply device 27. In this way, the cooling oxidation unit 26 is uniformly dampened with dripping water W1 supplied through a water spray mouth 41a due to the rotation of the water dispersion bodies 41.

ADVANTAGEOUS EFFECTS OF THE INVENTION

Thus, the oxygen-supply-capable cooling water equipment in accordance with the present invention is constructed so that the air flow through the air supply device 27 is made to run against water W to be treated thereby forming a counter-current within the cooling oxidation unit 26. While the cooling oxidation unit 26 comprises a porous honeycomb-shaped body, or a porous lattice-shaped body, through which the water W to be treated runs down and the air flow A runs up, the air flow is eventually discharged linearly from the upper face side of the tank body 20. Accordingly, the oxygen content in water W to be treated is substantially increased by the processes performed by the equipment U or T, and water splashing outside of the tank body 20 is thoroughly prevented, which results in a significant enhancement in the biological purification capabilities of the equipment. The enhanced cooling, oxygenation, and treatment capabilities of the present invention makes it possible to construct oxygen-supply-capable cooling water equipment that is smaller in size, thereby reducing the manufacturing costs and also achieving energy saving and the like.

In accordance with the present invention, silencing and filtration material 28 is installed at the lower portion of the cooling oxidation unit 26 so that when water W to be treated moves through the cooling oxidation unit 26 and drips as treated water $W_3$ onto the silencing and filtration material 28, filtration and the elimination of the noises caused by the dripping water occurs. In the present invention, the silencing and filtration material 28 thoroughly eliminates these water dripping noises, and makes the treated water better in quality.

Also, in accordance with the present invention, a dripping water guide body 25 is installed on the upper portion of the cooling oxidation unit 26 so that water W to be treated drips onto the cooling oxidation unit 26 through a dripping water guide pipe 25b connected with the dripping water guide body. These structures make the water W to be treated drip quite uniformly on the upper face of the cooling oxidation unit 26, which eliminates problems caused by the uneven spread of dripping water.

The filtration equipment F in accordance with the present invention, is constructed so that a plurality of filtration boxes, filled with suitable filters, are removably secured in a filtration tank body 35. In one embodiment in accordance with the present invention, the filtration boxes are removably installed in the filtration tank body 25 by making each filtration box a removable modular cassette that contains a filter. Treated water W3 emerging through the oxygen-supply-capable cooling water equipment U runs through the filtration boxes from the down-to-upward direction, then the filtrated-treated water W4 flows from the upper portion of the filtration boxes and runs back to the water tank Wt.

As a result of the structural features provided by equipment T or F in accordance with the present invention, stable, high performance filtration is achieved by replacing filters of the filtration boxes in a staggered rotating fashion so that the equipment T or F works functionally in biologically highly activated conditions all the time. Specifically, while replacing one of the filters or one of the filtration boxes, the other activated filters or filtration boxes can remain untouched and left in water because the filters and filtration boxes of the filtration equipment F are divided into a plural number of blocks/boxes so as to be modular. This means that each filter's biological filtration performance (also referred to as "biological activation") is not affected by replacement of one of the other filters or filtration boxes because those filters/filtration boxes not presently being replaced remain in the water and continue to operate without disturbance.

The filtration-function-equipped cooling water equipment T in accordance with the present invention is constructed so that the oxygen-supply-capable cooling water equipment U and the filtration equipment F are combined organically for purifying water in the water tank that is in continual circulation. Accordingly, water in the water tank is maintained in a highly purified and oxygen-dissolved condition, which enables aquatic life, such as fish and water plants, to be raised with better results and with improved survival rates for these living creatures. In addition, because the filtration-function-equipped cooling water equipment T in accordance with the present invention can be made more compact than conventional devices, it has a better appearance and achieves other excellent, practical effects.

As stated, filtration-function-equipped cooling water equipment in accordance with the present invention is provided with an internal splash prevention device with improved design and a good appearance. Furthermore, it has been determined that equipment constructed in accordance with the present invention is fully competent for (a) biologically and chemically prompting oxidation of substances that are dissolved by dissolving oxygen efficiently into circulating water, (b) sufficiently lowering the water temperature to the level of a desired wet-bulb temperature, (c) securing a sufficient volume of dissolved oxygen in a water tank having closed water circulation by providing equipment with a filtration device carefully developed from biological filtration studies, and (d) achieving improvements in raising living creatures, and the like, by upgrading filtration functions.

The invention claimed is:

1. Filtration equipment comprising:
   a filtration tank body having a water discharge mouth on an upper side portion and a water supply mouth on an upper face side;
   a partitioned draining board disposed inside a lower portion of the filtration tank body;
   a bulkhead disposed vertically inside the tank body so as to define a water supply space and a filtration space; and
   a plurality of filtration boxes removably secured, in parallel, inside the filtration space and supported by the partitioned draining board, wherein each filtration box is disposed so that water runs from a bottom face side to an upper face side of each filtration box so that flowing water runs from the water supply space through the lower portion of the filtration tank body and then through the plurality of filtration boxes before being discharged at the water discharge mouth, wherein the plurality of filtration boxes includes three independent filtration boxes, and the three independent filtration boxes are disposed in a main filtration box located within the filtration space, wherein the main filtration box is divided into three compartments and each compartment is dimensioned to receive one of the three independent filtration boxes, a plurality of projected engagement bodies are disposed on a lower face side of a cylindrical discharge body to form the water discharge mouth, wherein when the plurality of projected engagement bodies engage a reinforcement material of an upper portion of a water tank; and the filtration tank body is connected with the water tank.

2. Filtration-function-equipped cooling water equipment comprising:
   (a) oxygen-supply-capable cooling water equipment comprising:
      i. a first tank body having an air inlet and an air exhaust port located on an upper face side, and a treated water discharge mouth disposed on a lower portion of the first tank body;
      ii. a cooling oxidation unit disposed inside the first tank body;
      iii. a water dripping member installed horizontally at an upper portion of the cooling oxidation unit, wherein the dripping water member drips untreated water so as to disperse the untreated water onto the cooling oxidation unit;
      iv. a silencing and filtration material disposed at a lower portion of the cooling oxidation unit to filtrate water dripping from the cooling oxidation unit; and
      v. an air supply device that operates to run air flow into the cooling oxidation unit from the lower portion to the upper portion of the cooling oxidation unit; and
   (b) filtration equipment comprising:
      i. a filtration tank body having a water discharge mouth on an upper side portion and a water supply mouth on an upper face side;
      ii. a partitioned draining board disposed inside a lower portion of the filtration tank body;
      iii. a bulkhead disposed vertically inside the filtration tank body so as to define a water supply space and a filtration space; and
      iv. a plurality of filtration boxes removably secured, in parallel, inside the filtration space and supported by the partitioned draining board, wherein each filtration box is disposed so that water runs from a bottom face side to an upper face side of each filtration box so that flowing water runs from the water supply space through the lower portion of the filtration tank body and then through the plurality of filtration boxes before being discharged at the water discharge mouth, wherein the oxygen-supply-capable cooling water equipment is connected to the filtration equipment so that the treated water discharge mouth of the oxygen-supply-capable cooling water equipment communicates with the water supply mouth and supplies treated water to the water supply mouth of the filtration equipment.

3. Filtration-function-equipped cooling water equipment claimed in claim 2, wherein an external shape of the lower portion of the first tank body of the oxygen-supply-capable cooling water equipment and an external shape of the lower portion of the filtration tank body of the filtration equipment have identical dimensions.

4. Filtration-function-equipped cooling water equipment claimed in claim 2, wherein the oxygen-supply-capable cooling water equipment is integrally connected to the filtration equipment so as to form a single unit wherein the first tank body is not separable from the filtration tank body.

5. Oxygen-supply-capable cooling water equipment comprising:
   (a) a tank body provided with an air inlet and an air exhaust port on an upper face side, and a treated water discharge mouth disposed on a lower portion of the tank body;
   (b) a cooling oxidation unit disposed inside the tank body;
   (c) a water dripping member installed horizontally at an upper portion of the cooling oxidation unit, wherein the dripping water member drips untreated water so as to disperse the untreated water onto the cooling oxidation unit and the dripping water member includes a propeller-shaped revolving dispersion body, a plurality of water spray mouths oriented to downwardly jet-spray water to be treated supplied from a water guide pipe, and a bearing disposed at an upper end of the water guide pipe, wherein the bearing supports the revolving dispersion body so that the revolving dispersion body is free to rotate, wherein when water jet-sprays from the plurality of water spray mouths the revolving dispersion body reacts to the jet-sprayed water by rotating, and wherein when the air flow exhausts upwardly through the air exhaust port the revolving dispersion body reacts to the air flow by rotating;
   (d) a silencing and filtration material disposed at a lower portion of the cooling oxidation unit to filtrate treated water dripping from the cooling oxidation unit; and
   (e) an air supply device that operates to run air flow into the cooling oxidation unit from the lower portion to the upper portion of the cooling oxidation unit.

* * * * *